Patented Sept. 10, 1940

2,214,481

UNITED STATES PATENT OFFICE 2,214,481

ALKYLATION OF PARAFFIN HYDROCARBONS

Louis Schmerling and Herman Pines, Chicago, Ill., assignors to Universal Oil Products Company, Chicago, Ill., a corporation of Delaware No Drawing. Application March 25, 1939, Serial No. 264,122

9 Claims. (Cl. 196—10)

This invention relates to the treatment of iso or branched chain paraffin hydrocarbons.

In a more specific sense the invention is concerned with a novel process for alkylating iso or branched chain paraffin hydrocarbons with olefinic hydrocarbons to produce saturated hydrocarbons of higher molecular weight which can be utilized as constituents of motor fuel.

The cracking process which is operated principally with the object of producing gasoline from heavier and less valuable petroleum fractions incidentally produces considerable yields of fixed gases consisting of hydrogen, methane, ethane, propane, and butanes, as well as ethylene, propene, and butenes in varying quantities and proportions. In most instances, these gases are considered to be valuable merely as fuel, although attempts have been made from time to time to utilize the olefinic constituents for the manufacture of hydrocarbon derivatives on a commercial basis.

In one application of the present process the isobutane and olefins present in cracked gas mixtures are utilized as a source of additional yields of motor fuel fractions to augment those produced primarily by cracking. While the process is particularly applicable to the utilization of the hydrocarbons in cracked gas mixtures and in selected fractions produced therefrom in the stabilizers of cracking plants, it is also applicable to the treatment of branched chain paraffins and olefins produced from any other source. Efforts to alkylate normal paraffin hydrocarbons with olefins in the presence of catalysts have thus far failed unless concurrent isomerization of the normal to branched chain paraffin occurs. Isobutane, however, may be made to interact with olefins to produce saturated products, and with butenes, particularly isobutene, in the presence of various catalysts to form branched chain octanes commonly referred to as "iso-octanes." Isopentane may be alkylated similarly by olefins, such as propene, the butenes, etc.

In one specific embodiment the present invention comprises a process for alkylating isoparaffin hydrocarbons with mono-olefinic hydrocarbons in the presence of mixed catalysts consisting of liquid hydrogen fluoride and sulfuric acid.

Whereas previous work in alkylating various classes of hydrocarbons with olefins has indicated that the reactions can be brought about in the presence of boron fluoride and minor amounts of hydrogen fluoride, these reactions are better effected when using liquid hydrogen fluoride admixed with sulfuric acid. Although hydrogen fluoride boils at about 20° C. its mixture with sulfuric acid may be handled readily so that the mixture can be used in an apparatus cooled to maintain temperatures at or below this point, or it can be employed at a higher temperature if sufficient pressure is maintained on the apparatus. The continual maintenance of an excess of isoparaffin minimizes polymerization and the formation of alkyl fluorides so that the products consist essentially of higher boiling isoparaffins formed mainly by reaction of the olefinic hydrocarbons with the isoparaffin charged.

The total reactions occurring when an isoparaffin is catalytically alkylated with an olefin will necessarily involve to some extent not only simple alkylation corresponding to the addition of one or more molecules of the olefin to an isoparaffin, but also some reactions of polymerization and some decomposition so that the net result is the production of a mixture of hydrocarbons having a considerable boiling range, but containing a large portion of mono-alkylated products. The reactions of polymerization are usually of a negligible order when a moderate excess of isoparaffin is present in the reaction zone.

The proportions of hydrogen fluoride and sulfuric acid used as the preferred catalyst mixture will depend upon the hydrocarbons being reacted and upon the conditions of operation chosen. For example, we have found that the use of relatively small amounts of hydrogen fluoride results in the formation of products containing fluorine, whereas the use of relatively large amounts of hydrogen fluoride leads to the formation of alkylation products substantially free from fluorine. Apparently such excess of hydrogen fluoride behaves as a dehydrofluorinating catalyst. A temperature range of −10 to 60° C. and a pressure range of approximately 2–20 atmospheres has been found suitable for the alkylation of the lower boiling isoparaffins, as isobutane and isopentane by normally gaseous olefins, but these operating conditions may be altered for effecting similar reactions between higher boiling isoparaffins and olefins of varied structures.

Although the alkylation reactions are not understood clearly or completely it may be considered that addition of hydrogen fluoride to an olefin produces an alkyl fluoride and that such intermediately formed alkyl-fluoride next reacts with an isoparaffin, such as isobutane, producing higher boiling branched chain paraffins and regenerating hydrogen fluoride. Since this mechanistic concept may not represent accurately the reactions involved it should not be misconstrued to limit the scope of the invention.

In operating the present process the preferred procedure is to agitate a mixture of liquid hydrogen fluoride, sulfuric acid, and an isoparaffin and introduce gradually a mixture of an olefin and an isoparaffin below the surface of the mixture of acids and isoparaffin. In batch operation of this process the agitation may be stopped and the upper hydrocarbon layer removed and fractionated to recover the unchanged paraffins to be recycled and the desired alkylated products. Continuous operation of the process may be made by providing a mixing zone in which the isoparaffin, olefin, and mixed acid catalyst are contacted for a sufficient time to effect the completion of the desired alkylation reactions, after which the mixture is separated in a settling zone from which the hydrocarbon layer may be withdrawn and fractionated to recover the desired products and unconverted paraffin for recycling. From this settling zone the lower layer, consisting of the sulfuric acid-hydrogen fluoride catalyst, is pumped back to the reaction zone for further service.

In case a considerable portion of the alkylation product boils higher than the end point of commercial gasoline, fractionation of this hydrocarbon material may be made in two stages, the first stage, removing the uncombined 4-carbon atom hydrocarbons and being in effect a stabilization, and the second stage, distilling the gasoline boiling range material as an overhead. Details of such continuous procedures are more or less familiar to those conversant with oil refinery operations, and other procedures than those mentioned may suggest themselves which can be made without departing from the general broad scope of the invention.

The process of the present invention can be utilized successfully to produce octanes which are largely of an isomeric character from the mixtures of 4-carbon atom hydrocarbons which are obtainable either by the close fractionation of cracked gas mixtures, such as those produced as overhead from cracking plant stabilizers, or by utilizing a secondary cut of the overhead from the stabilizers which consist principally of the desired 4-carbon atom hydrocarbons, including isobutene, normal butenes, isobutane, and normal butane.

In the treatment of such mixtures with an alkylation catalyst, such as a liquid hydrogen fluoride and sulfuric acid mixture, the primary reactions involve principally the interaction of the isoparaffins with the olefins. Obviously the above procedure, before utilizing the isobutane and butenes in 4-carbon atom hydrocarbon fractions, can be followed only when there is a sufficient amount of isobutane to react with both the isobutene and n-butenes present. The reactions of the present invention, if desired, can be brought about between isobutane and n-butenes separated by fractionation and solvent extraction methods from 4-carbon atom hydrocarbon fractions. For example, the olefins may be concentrated by their preferential solubility in various types of hydrocarbon and other solvents, and the olefin concentrate fractionated to substantially separate isobutene from the higher boiling isomeric n-butenes. Similarly, isobutane and n-butane can be separated by the fractionation of the raffinate. For the proper functioning of a process of the present character it is usually advisable to employ these preliminary separation methods to be able to proportion the isobutane and butenes to avoid any tendency for polymerization reactions to occur.

In the presence of an excess of isobutane, one molecular equivalent of n-butene tends to react with its molecular equivalent of isobutane forming an octane while the excess of isobutane remains unaffected. When more butene is used than corresponds to about one mole to two moles of isobutane, there is an increased tendency for polymerization reactions to occur in preference to alkylation reactions. This is to be expected to some extent on account of the readiness with which butenes alone are polymerized by acid catalysts. However, by maintaining the proper excess of isoparaffin hydrocarbon the course of the reactions may be kept principally in the direction of production of products of a saturated rather than an olefinic character. Besides the primary reaction of an isoparaffin with an olefin there is some production of higher boiling products due to the reaction of one molecule of an isoparaffin with two molecules of an olefin forming a dialkylated paraffin and also some formation of intermediate products by reason of decompositions and realkylations.

The following experimental data are given to indicate typical results obtainable when utilizing the present process for alkylating isoparaffins with olefins to form higher boiling branched chain paraffinic hydrocarbons. The examples given have been chosen because of the importance of the reaction and it is not to be inferred that the scope of the invention is limited in correspondence with the data presented.

*Example 1.*—Reaction of isobutane with n-butenes was carried out in a number of batch runs in the presence of mixtures of hydrogen fluoride and sulfuric acid at 30° C. under the vapor pressure of the hydrocarbon mixture charged, with the results given in the following table:

|  | Experiment No. | | | | | |
| --- | --- | --- | --- | --- | --- | --- |
|  | 1 | 2 | 3 | 4 | 5 | 6 |
| $HF:H_2SO_4$ (mol ratio) | 1.3:1.0 | 1.1:0.25 | 0.3:1.0 | 0.0:1.0 | 1.1:0.0 | 5.0:1.25 |
| HF.mol percent of total catalyst | 56.5 | 81.5 | 23.1 | 0 | 100 | 80 |
| Reactants, parts by weight: | | | | | | |
|   Sulfuric acid | 100 | 25 | 100 | 100 | 0 | 125 |
|   Hydrogen fluoride | 26 | 22 | 7 | 0 | 22 | 100 |
|   Isobutane | 241 | 224 | 224 | 224 | 204 | 202 |
|   n-Butene | 112 | 112 | 112 | 112 | 137 | 134 |
| Products, parts by weight: | | | | | | |
|   Stabilized liquid | 209 | 166 | 215 | 167 | 190 | 240 |
|   Lower layer | 134 | 46 | 112 | 109 |  | 230 |
|   Recovered isobutane | 125 | 168 | 116 | 151 | 172 | 67 |
|   Loss | 11 | 3 | 0 | 9 | 0 | 24 |
| Olefin/paraffin reacted, mol ratio | 1.2 | 2.1 | 1.1 | 2.1 | 2.1 | 1.3 |
| Octane, percent by weight of product |  |  | 42.0 | 29.0 | 37.0 | 50.0 |

The advantage of adding hydrogen fluoride to sulfuric acid is apparent from the fact that with these acid mixtures the liquid products which were obtained in larger yield contained 42% and 50% of octanes (Experiments 3 and 6, respectively) as compared with 29% of octane obtained when sulfuric acid was used alone as catalyst in Experiment 4. With hydrogen fluoride alone as catalyst in Experiment 5 the octane yield was 37%.

Example 2.—In the presence of 4.4 molar portions of hydrogen fluoride and 1.0 molar portion of 97% sulfuric acid, a mixture containing 249 parts by weight of isobutane and 77 parts by weight of propene reacted at 30° C. forming 106 parts by weight of stabilized liquid products containing 61% by weight of heptanes. The improved catalytic action of the hydrogen fluoride-sulfuric acid mixture is therefore apparent since propene does not react with isobutane in the presence of 97% sulfuric acid.

The character of the process of the present invention, and particularly its commercial value, are evident from the preceding specification and numerical data presented, although neither section is intended to be unduly limiting in its generally broad scope.

We claim as our invention:

1. A process for synthesizing hydrocarbons which comprises alkylating an isoparaffin with an olefin in the presence of a mixture of hydrogen fluoride and sulfuric acid.

2. A process for producing liquid hydrocarbons from hydrocarbon gases which comprises alkylating a normally gaseous isoparaffin with a normally gaseous olefin in the presence of a mixture of hydrogen fluoride and sulfuric acid.

3. A process for producing hydrocarbons boiling in the gasoline range which comprises alkylating isobutane with a normally gaseous olefin in the presence of a mixture of hydrogen fluoride and sulfuric acid.

4. A process for producing octanes which comprises alkylating isobutane with a butene in the presence of a mixture of hydrogen fluoride and sulfuric acid.

5. A process for converting normally gaseous hydrocarbons into normally liquid saturated hydrocarbons of relatively higher molecular weight which comprises alkylating a normally gaseous isoparaffin with a normally gaseous mono-olefin in the presence of a mixture of hydrogen fluoride and sulfuric acid while maintaining the reactants in essentially a liquid phase.

6. A process for producing saturated hydrocarbons having molecular weights suitable for use as motor fuel constituents which comprises alkylating an isoparaffin of relatively low molecular weight with a mono-olefin of relatively low molecular weight in the presence of a mixture of hydrogen fluoride and sulfuric acid at a temperature of the approximate order of −10 to 60° C. under a pressure in the approximate range of 2–20 atmospheres.

7. A process for producing octanes which comprises alkylating isobutane with isobutene in the presence of a mixture of hydrogen fluoride and sulfuric acid at a temperature of the approximate order of −10 to 60° C. under a pressure in the approximate range of 2–20 atmospheres.

8. A process for producing octanes which comprises alkylating isobutane with normal butene in the presence of a mixture of hydrogen fluoride and sulfuric acid at a temperature of the approximate order of −10 to 60° C. under a pressure in the approximate range of 2–20 atmospheres.

9. A process for producing heptanes which comprises alkylating isobutane with propene in the presence of a mixture of hydrogen fluoride and sulfuric acid at a temperature of the approximate order of −10 to 60° C. under a pressure in the approximate range of 2–20 atmospheres.

LOUIS SCHMERLING.
HERMAN PINES.